(12) United States Patent
Kaiwa et al.

(10) Patent No.: US 12,100,970 B2
(45) Date of Patent: Sep. 24, 2024

(54) WIRELESS POWER RECEPTION DEVICE

(71) Applicant: Murata Manufacturing Co., Ltd., Kyoto-fu (JP)

(72) Inventors: Koyo Kaiwa, Nagaokakyo (JP); Tatsuya Hosotani, Nagaokakyo (JP); Takahiro Nagai, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 0 days.

(21) Appl. No.: 18/307,073

(22) Filed: Apr. 26, 2023

(65) Prior Publication Data

US 2023/0268774 A1  Aug. 24, 2023

Related U.S. Application Data

(63) Continuation of application No. PCT/JP2021/036966, filed on Oct. 6, 2021.

(30) Foreign Application Priority Data

Nov. 5, 2020 (JP) .................... 2020-185054

(51) Int. Cl.
*H02J 50/12* (2016.01)
*H02J 50/80* (2016.01)
(Continued)

(52) U.S. Cl.
CPC .............. *H02J 50/12* (2016.02); *H02J 50/80* (2016.02); *H02M 3/33571* (2021.05); *H02M 3/33573* (2021.05); *H04B 5/79* (2024.01)

(58) Field of Classification Search
CPC ........ H02J 50/12; H02J 50/80; H02J 7/00034; H02J 7/00; H02M 3/33571;
(Continued)

(56) References Cited

U.S. PATENT DOCUMENTS

2013/0289334 A1* 10/2013 Badstibner .............. H01F 38/14
  307/104
2014/0227986 A1* 8/2014 Kanno ..................... H04B 1/04
  455/115.1
(Continued)

FOREIGN PATENT DOCUMENTS

JP   2011-030299 A   2/2011
JP   2013-187579 A   9/2013
(Continued)

OTHER PUBLICATIONS

International Search Report issued in PCT/JP2021/036966; mailed Dec. 21, 2021.

*Primary Examiner* — Jared Fureman
*Assistant Examiner* — Michael J Warmflash
(74) *Attorney, Agent, or Firm* — Studebaker & Brackett PC

(57) ABSTRACT

A magnetic coupling coefficient between a power reception coil and a communication antenna is 0.3 or less. A power management circuit suppresses electromagnetic interference between the power reception coil and the communication antenna in a predetermined time period by causing a rectification stopping circuit to operate to keep the rectification stopping circuit in an operation state in the predetermined time period with a received power voltage exceeding a first threshold value and by changing a resonant frequency of a power reception resonant circuit to a frequency different from a frequency being used in a wireless communication circuit to keep the resonant frequency in a changed state.

20 Claims, 13 Drawing Sheets

(51) Int. Cl.
*H02M 3/335* (2006.01)
*H04B 5/79* (2024.01)

(58) Field of Classification Search
CPC ...... H02M 3/33573; H02M 1/44; H02M 3/01; H02M 3/33576; H04B 5/79; H04B 5/48; H04B 5/72

See application file for complete search history.

(56) References Cited

U.S. PATENT DOCUMENTS

2016/0141919 A1* 5/2016 Ohashi .................... H02J 50/90
320/108
2017/0118714 A1* 4/2017 Kaechi .................... H04B 5/79

FOREIGN PATENT DOCUMENTS

| | | |
|---|---|---|
| JP | 2017-085682 A | 5/2017 |
| JP | 2019-115148 A | 7/2019 |
| WO | 2018/037758 A1 | 3/2018 |

\* cited by examiner

WIRELESS POWER RECEPTION DEVICE

CROSS-REFERENCE TO RELATED APPLICATIONS

This application claims benefit of priority to International Patent Application No. PCT/JP2021/036966, filed Oct. 6, 2021, and to Japanese Patent Application No. 2020-185054, filed Nov. 5, 2020, the entire contents of each are incorporated herein by reference.

BACKGROUND

Technical Field

The present disclosure relates to a wireless power reception device that wirelessly receives power, charges an electrical energy storage device, supplies power to an electronic functional circuit, and also performs predetermined wireless communication.

Background Art

International Publication No. 2018/037758 discloses a wireless power reception device that avoids reception of large power and suppresses heat generation without miniaturization thereof being hindered. This wireless power reception device includes a rectifier element, a transistor element, and an equivalent resonant capacitor. The rectifier element and the transistor element are electrically connected to a power reception coil. The transistor element switches between a conductive operation and a capacitive operation and includes a parallel capacitor. The equivalent resonant capacitor resonates with an inductance component included in the power reception coil. The wireless power reception device has a received power adjustment function in which, when a voltage detected by a voltage detection circuit reaches a threshold value, the transistor element is turned on to perform the conductive operation, the equivalent resonant capacitor is changed to change a resonant frequency of a power reception circuit, a rated rectification operation is simultaneously stopped, and a flow of power to an output unit is stopped to stop a power receiving operation in which power is supplied from the power reception coil to the output unit.

SUMMARY

In International Publication No. 2018/037758, the equivalent resonant capacitor can be changed to change a resonant frequency of the power reception circuit, the rated rectification operation can be simultaneously stopped, and the flow of power to the output unit can be stopped to stop the power receiving operation in which power is supplied from the power reception coil to the output unit. However, if a communication antenna is installed in proximity to the power reception coil, electromagnetic interference is likely to occur between the power reception coil and the communication antenna. In particular, when a power reception interruption circuit operates due to a strong magnetic field generated by an external power transmission device, such as a reader/writer, or when the power reception interruption circuit operates due to an electrical energy storage device that has sufficient energy or is fully charged, the communication antenna is likely to interfere electromagnetically with the power reception coil. Occurrence of such strong electromagnetic interference may result in poor communication.

Thus, the present disclosure aims to provide a wireless power reception device that wirelessly receives power and performs predetermined wireless communication. In the wireless power reception device, when a magnetic field generated by an external power transmission device, such as a reader/writer, is strong, or when an electrical energy storage device has sufficient energy or is fully charged, a power receiving operation is interrupted in which power is supplied to the electrical energy storage device, and electromagnetic interference between a power reception coil and a communication antenna is suppressed.

As an example of the present disclosure, a wireless power reception device includes a power reception coil that magnetically couples to an external reader/writer-side coil, a resonant capacitor that constitutes a power reception resonant circuit together with the power reception coil, a rectifier smoothing circuit that rectifies and smooths a voltage of the power reception resonant circuit, and a received power voltage detection circuit that detects an output voltage of the rectifier smoothing circuit. The wireless power reception device also includes an electrical energy storage device, a charging circuit that charges the electrical energy storage device with an output of the rectifier smoothing circuit, a communication antenna that magnetically couples to the reader/writer-side coil, a wireless communication circuit that is connected to the communication antenna, and an electronic functional circuit that is connected to the wireless communication circuit and performs input and output of a signal. The wireless power reception device further includes a power management circuit that is connected to the electrical energy storage device and supplies a power-supply voltage to the electronic functional circuit, and a rectification stopping circuit that is connected to an input portion of the rectifier smoothing circuit or connected to the rectifier smoothing circuit and that causes the rectifier smoothing circuit to stop a rectification operation.

A magnetic coupling coefficient between the power reception coil and the communication antenna is 0.3 or less. The power management circuit suppresses electromagnetic interference between the power reception coil and the communication antenna in a predetermined time period by causing the rectification stopping circuit to operate to keep the rectification stopping circuit in an operation state in the predetermined time period with a received power voltage exceeding a first threshold value and by changing a resonant frequency of the power reception resonant circuit to a frequency different from a frequency being used in the wireless communication circuit to keep the resonant frequency in a changed state.

The present disclosure can provide the wireless power reception device in which, when a magnetic field generated by an external power transmission device, such as a reader/writer, is strong, or when the electrical energy storage device has sufficient energy or is fully charged, a power receiving operation is interrupted in which power is supplied to the electrical energy storage device, and electromagnetic interference between the power reception coil and the communication antenna is suppressed.

DETAILED DESCRIPTION

A plurality of forms for implementing the present disclosure will be described below by giving some specific examples with reference to figures. In the figures, the same elements are denoted by the same reference signs. In consideration of ease of description or understanding of main points, a plurality of embodiments will be described separately for convenience of explanation. However, configurations described in different embodiments can be partially replaced or combined. In second and subsequent embodiments, a description of things in common with a first embodiment is omitted, and only respects in which the second and subsequent embodiments differ from the first embodiment will be described. In particular, similar function effects achieved by similar configurations are not repeatedly described in each embodiment.

First Embodiment

Figure 1:
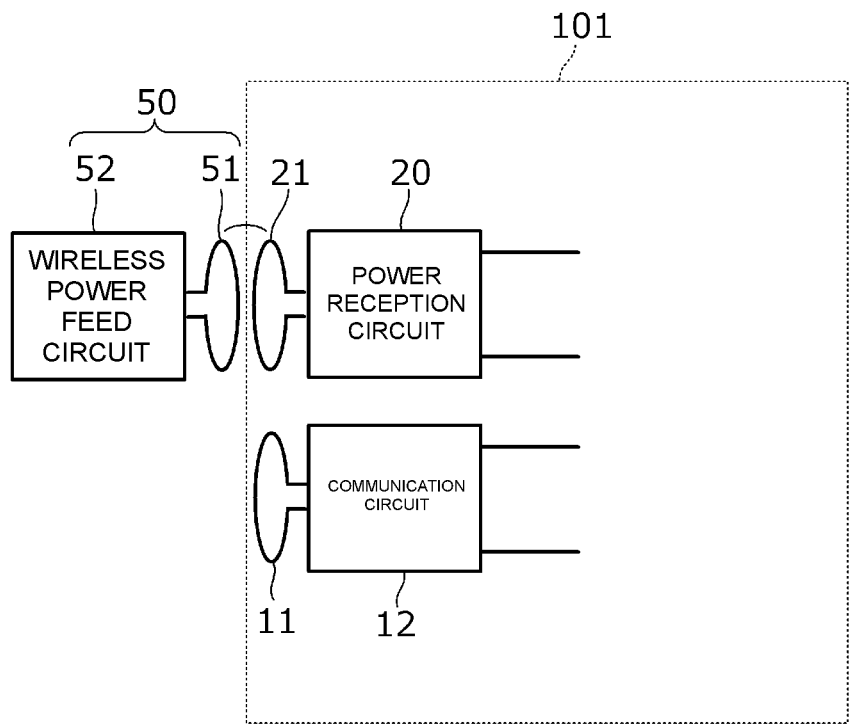
FIG. 1 is a block diagram illustrating a configuration of an electronic card and an electronic card system according to a first embodiment.
Figure 2:
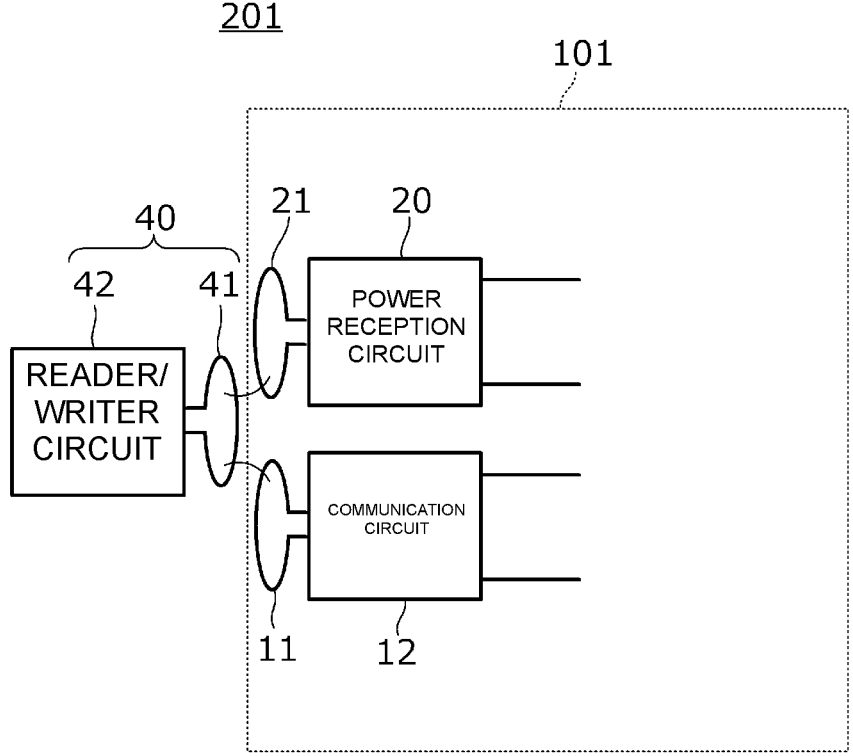
FIG. 2 is a block diagram illustrating another configuration of the electronic card and the electronic card system according to the first embodiment.

FIGS. 1 and 2 are block diagrams each illustrating a configuration of an electronic card 101 and an electronic card system 201 according to a first embodiment. This electronic card system 201 is constituted by the electronic card 101 and a reader/writer 40. Furthermore, the electronic card system 201 is constituted by the electronic card 101 and a wireless power feed device 50. In this embodiment, the electronic card 101 corresponds to "wireless power reception device" according to the present disclosure.

FIG. 1 partially illustrates an internal configuration of the electronic card 101. The electronic card 101 includes a power reception coil 21, a power reception circuit 20 connected to this power reception coil 21, a communication antenna 11, and a communication circuit 12 connected to this communication antenna 11. The wireless power feed device 50 is constituted by a wireless power feed coil 51 and a wireless power feed circuit 52.

The wireless power feed device 50 is, for example, a wireless power feed device using a direct current resonance technology, or a smartphone for a case where a smartphone or the like having an NFC communication function is used as a charging device.

The wireless power feed circuit 52 supplies alternating-current power to the wireless power feed coil 51 in frequency bands of ISM bands (industrial, scientific, and medical bands), such as a 2.4 GHz band, a 5.7 GHz band, and a 920 MHz band, or in frequency bands of 6.78 MHz and 13.56 MHz.

In an example illustrated in FIG. 1, the power reception coil 21 magnetically couples to the wireless power feed coil 51, and the electronic card 101 wirelessly receives power from the wireless power feed device 50.

In FIG. 2, the reader/writer 40 is constituted by a reader/writer antenna 41 and a reader/writer circuit 42.

In an example illustrated in FIG. 2, the reader/writer antenna 41 magnetically couples to the communication antenna 11, and the electronic card 101 wirelessly communicates with the reader/writer 40. NFC communication (near field communication) with the communication circuit 12 is performed, for example, at a frequency in a 13.56 MHz band.

Furthermore, the power reception coil 21 magnetically couples to the reader/writer antenna 41, and the electronic card 101 wirelessly receives power from the reader/writer 40.

The electronic card 101 is an electronic device the size of a credit card, for example, with a thickness of 0.76 mm. Examples of this electronic card 101 include a smartphone the size of a card (mobile phone equipped with a mobile operating system), a transportation system electronic card that displays the balance, a one-time password card, and a biometric identification card.

Figure 3:
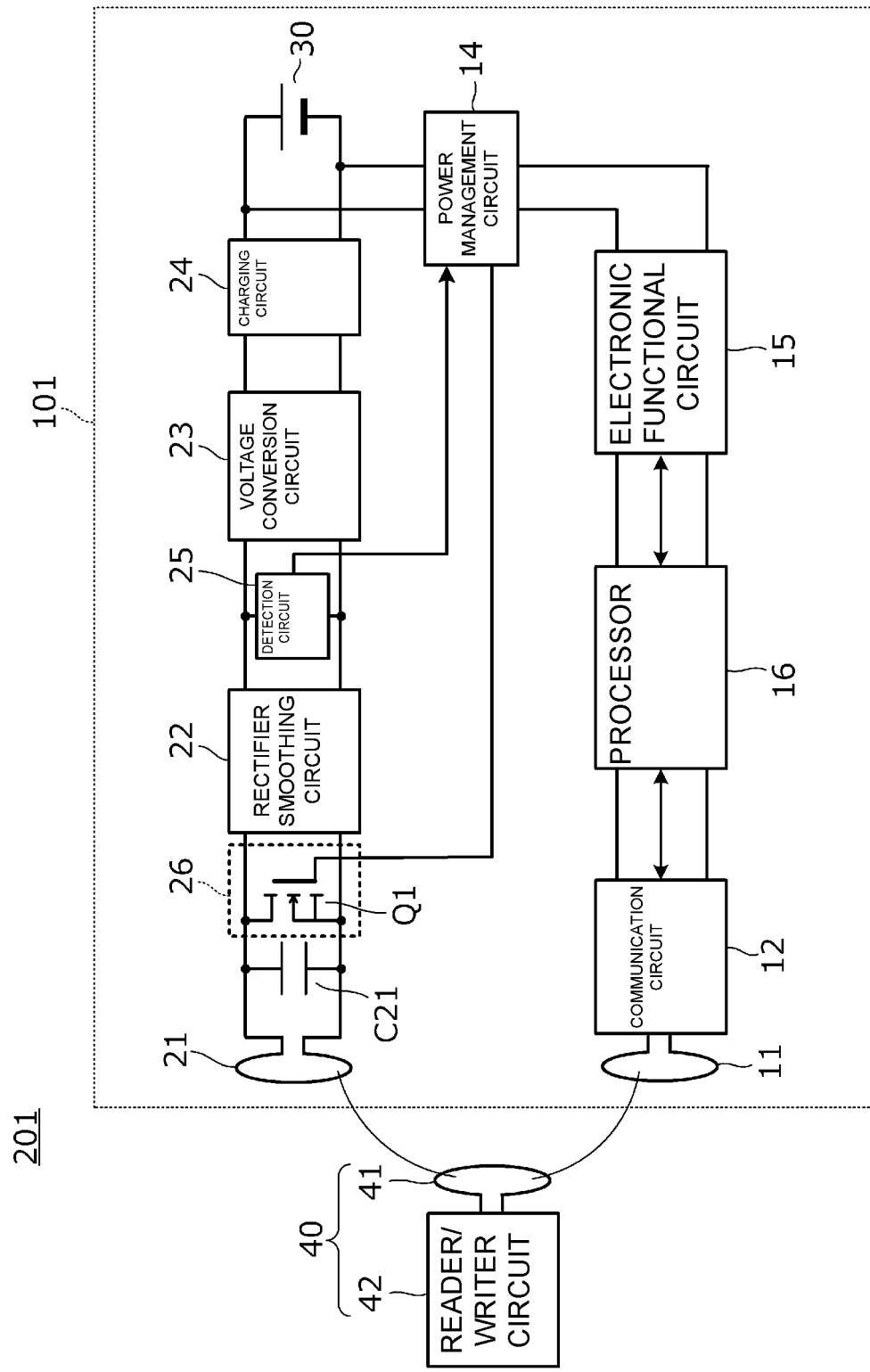
FIG. 3 is a block diagram illustrating a configuration of the electronic card.

FIG. 3 is a block diagram illustrating a configuration of the electronic card 101. The electronic card 101 includes the power reception coil 21, a power reception resonant capacitor C21, a rectifier smoothing circuit 22, a voltage detection circuit 25, an electrical energy storage device 30, and a charging circuit 24. Furthermore, the electronic card 101 includes the communication antenna 11, the communication circuit 12, a processor 16 connected to the communication circuit 12, an electronic functional circuit 15 connected to the processor 16, a power management circuit 14 connected between the electrical energy storage device 30 and the electronic functional circuit 15, and a rectification stopping circuit 26. The processor 16 comprises a microcontroller or a circuit including a microcontroller. The electronic card 101 operates actively by using the electrical energy storage device 30 as a power supply.

The power reception resonant capacitor C21 constitutes a power reception resonant circuit together with the power reception coil 21. The rectification stopping circuit 26 causes, in accordance with an output signal of the power management circuit 14, the rectifier smoothing circuit 22 to stop a rectification operation. The rectification stopping circuit 26 is constituted by a switch element Q1 connected in parallel with the power reception resonant circuit. The voltage detection circuit 25 detects an output voltage (received power voltage) of the rectifier smoothing circuit 22. A voltage conversion circuit 23 converts the output voltage of the rectifier smoothing circuit 22 to a predetermined voltage. The charging circuit 24 charges the electrical energy storage device with an output of the voltage conversion circuit 23.

A magnetic coupling coefficient between the power reception coil 21 and the communication antenna 11 is 0.3 or less. It is more desirable that the magnetic coupling coefficient between the power reception coil 21 and the communication antenna 11 be 0.1 or less.

The power management circuit 14 supplies a power-supply voltage to the electronic functional circuit 15, the processor 16, and the communication circuit 12. When the received power voltage detected by the voltage detection circuit 25 exceeds a first threshold value Va1, the power management circuit 14 turns on the switch element Q1 of the rectification stopping circuit 26. This displaces a resonant frequency of the power reception resonant circuit to a frequency greatly different from a resonant frequency exhibited during normal wireless power reception. For this reason, wireless power reception is substantially stopped.

Furthermore, the power management circuit 14 causes the rectification stopping circuit 26 to operate to keep the rectification stopping circuit 26 in an operation state in a predetermined time period with the received power voltage exceeding the first threshold value and changes the resonant frequency of the power reception resonant circuit to a frequency different from a frequency being used in the wireless communication circuit to keep the resonant frequency in a changed state.

The above-described function interrupts reception of power from the power reception coil 21 in the predetermined time period described above and also avoids interference between the power reception coil 21 and the communication antenna 11. In particular, since the magnetic coupling coefficient between the power reception coil 21 and the communication antenna 11 is 0.3 or less, the interference between the power reception coil 21 and the communication antenna 11 is more effectively suppressed. If the magnetic coupling coefficient between the power reception coil 21 and the communication antenna 11 is 0.1 or less, the interference between the power reception coil 21 and the communication antenna 11 is further suppressed.

The predetermined time period described above is preferably a time period that elapses before communication operation of the communication circuit 12 is completed. Consequently, the above-described interference can be avoided over the whole time period of wireless communication.

Furthermore, after the received power voltage reaches the first threshold value Va1, the power management circuit 14 keeps power reception in an interrupted state until the received power voltage falls below a second threshold value Va2 lower than the first threshold value Va1. In this configuration, after the received power voltage exceeds the first threshold value and wireless power reception is temporarily interrupted, power reception is kept in the interrupted state until the received power voltage falls below the second threshold value, and thus hysteresis occurs. For this reason, even if the received power voltage transitions around the first threshold value Va1 while wireless power reception is in the interrupted state, power reception does not frequently transition between the interrupted state and an uninterrupted state, and stable power reception and communication are performed.

In this embodiment, the rectification stopping circuit 26 is constituted by the switch element Q1 composed of a transistor connected between input portions of the rectifier smoothing circuit 22, this switch element Q1 is connected in parallel with the power reception resonant capacitor C21 or the power reception coil 21, and thus turning on the switch element Q1 can cause the rectifier smoothing circuit 22 to stop its operation with certainty. Furthermore, turning on the switch element Q1 can greatly change the resonant frequency of the power reception resonant circuit constituted by the power reception coil 21 and the power reception resonant capacitor C21.

Second Embodiment

In a second embodiment, an electronic card including a power consumption circuit that consumes output power of the rectifier smoothing circuit is exemplified.

Figure 4:
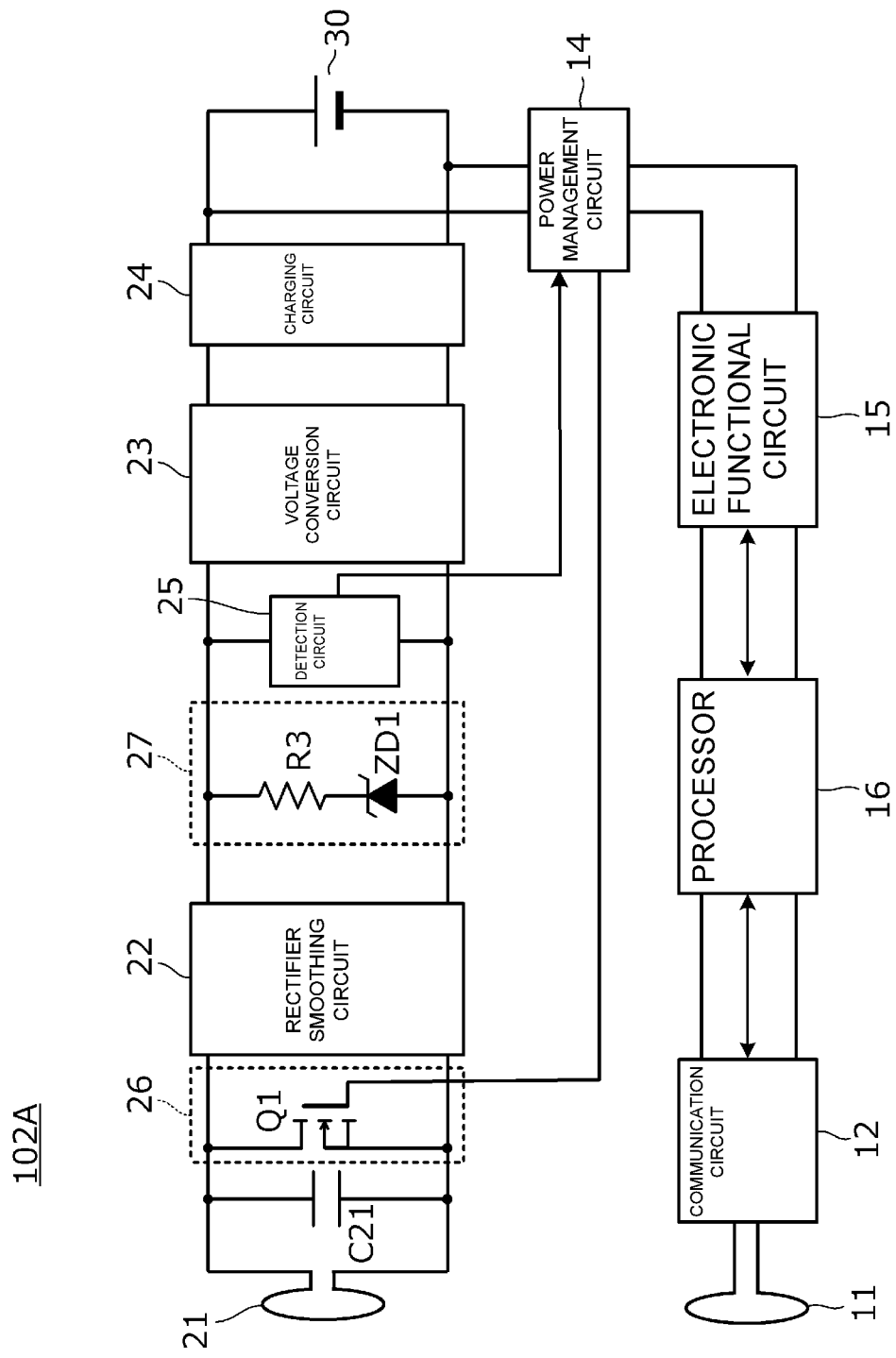
FIG. 4 is a block diagram illustrating a configuration of an electronic card according to a second embodiment.
Figure 5:
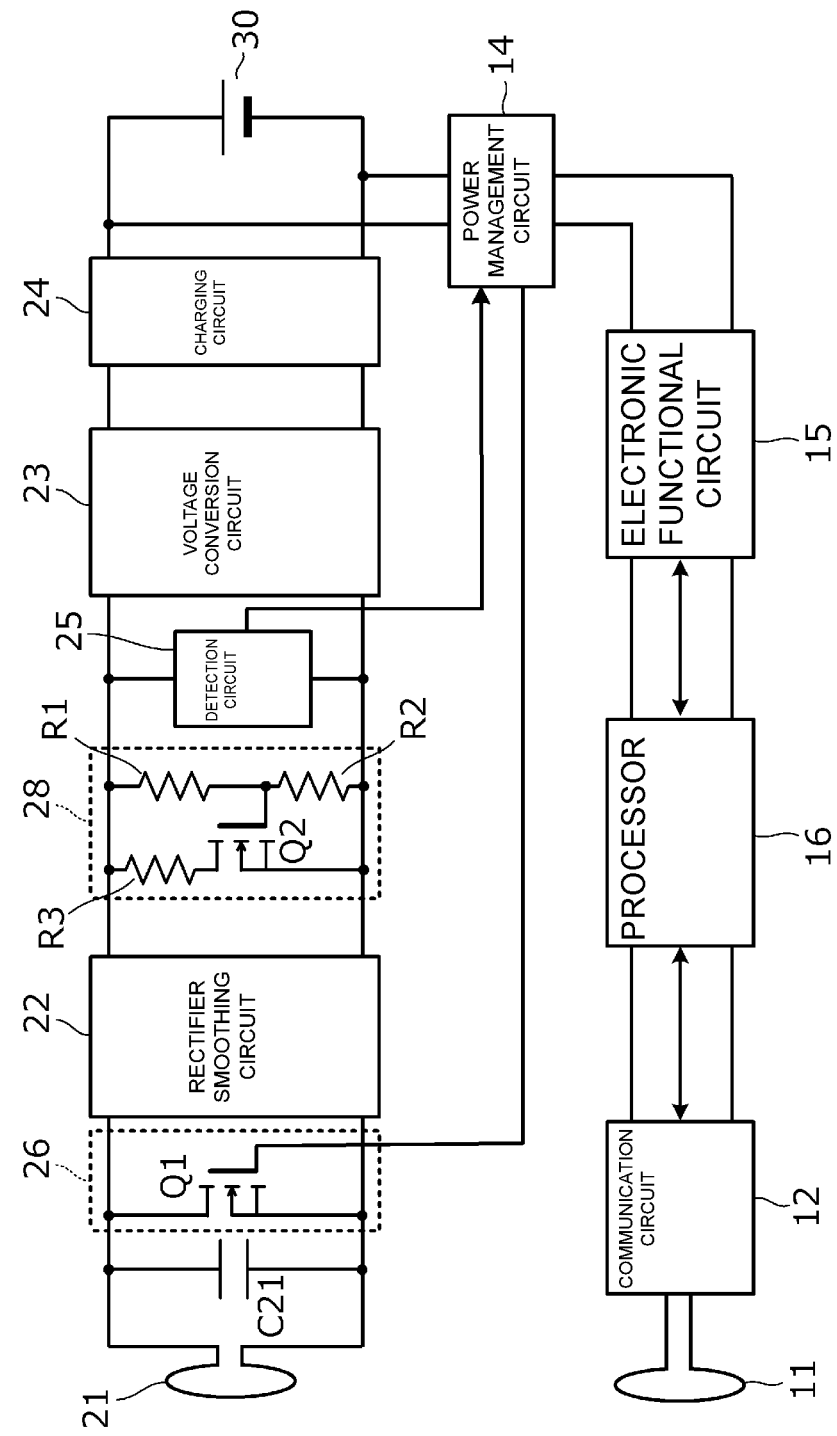
FIG. 5 is a block diagram illustrating a configuration of another electronic card according to the second embodiment.

FIG. 4 is a block diagram illustrating a configuration of an electronic card 102A according to the second embodiment. FIG. 5 is a block diagram illustrating a configuration of another electronic card 102B according to the second embodiment.

In FIG. 4, a power consumption circuit 27 is provided. A configuration of other portions other than the power consumption circuit 27 is as described in the first embodiment.

The power consumption circuit 27 is constituted by a Zener diode ZD1 and a resistance element R3 that are connected between output lines of the rectifier smoothing circuit 22. When an output voltage of the rectifier smoothing circuit 22 exceeds a Zener voltage of the Zener diode ZD1, conduction is performed, and mainly the resistance element R3 serves as a load of the power reception circuit. That is, when the output voltage of the rectifier smoothing circuit 22 exceeds the Zener voltage of the Zener diode ZD1, the power consumption circuit 27 functions as a dummy load of the rectifier smoothing circuit 22. When the Zener voltage (third threshold value Va3) of the Zener diode ZD1 is set to be lower than the first threshold value Va1, an output voltage to a stage subsequent to the rectifier smoothing circuit 22 does not abruptly exceed the first threshold value Va1 when the output voltage (received power voltage) of the rectifier smoothing circuit 22 increases gradually, and operation of the rectification stopping circuit 26 based on the fact that a received power voltage detected by the voltage detection circuit 25 exceeds the first threshold value Va1 is suppressed. Hence, interference between the power reception coil 21 and the communication antenna 11 due to the operation of the rectification stopping circuit 26 is suppressed.

In FIG. 5, a power consumption circuit 28 is provided. A configuration of other portions other than the power consumption circuit 28 is as described in the first embodiment.

The power consumption circuit 28 is constituted by a switch element Q2, and resistance elements R1, R2, and R3. The resistance elements R1 and R2 constitute a voltage divider circuit connected between the output lines of the rectifier smoothing circuit 22. An output voltage of this voltage divider circuit is applied as a gate-source voltage of the switch element Q2. When the output voltage of the voltage divider circuit exceeds a specified voltage, the switch element Q2 is turned on. With the switch element Q2 turned on, the resistance element R3 is put into a state in which the resistance element R3 is connected between the output lines of the rectifier smoothing circuit 22. That is, when an output voltage of the rectifier smoothing circuit 22 exceeds a predetermined value, a series circuit composed of the resistance element R3 and the switch element Q2 functions as a dummy load of the rectifier smoothing circuit 22. When a voltage (third threshold value Va3) at which the switch element Q2 is turned on is set to be lower than the first threshold value Va1, an output voltage to a stage subsequent to the rectifier smoothing circuit 22 does not abruptly exceed the first threshold value Va1 when the output voltage of the rectifier smoothing circuit 22 increases gradually, and operation of the rectification stopping circuit 26 based on the fact that a received power voltage detected by the voltage detection circuit 25 exceeds the first threshold value Va1 is suppressed. Hence, interference between the power reception coil 21 and the communication antenna 11 due to the operation of the rectification stopping circuit 26 is suppressed.

The responsivity of the Zener diode of the power consumption circuit 27 illustrated in FIG. 4 is high, and thus surge noise can be dealt with. Furthermore, the power consumption circuit 28 illustrated in FIG. 5 can pass a large dummy load current. Both the power consumption circuit 27 illustrated in FIG. 4 and the power consumption circuit 28 illustrated in FIG. 5 may be included.

Third Embodiment

In a third embodiment, an example of a specific configuration of the reader/writer 40 and a power reception circuit portion in an electronic card 103, in particular, is exemplified.

Figure 6:
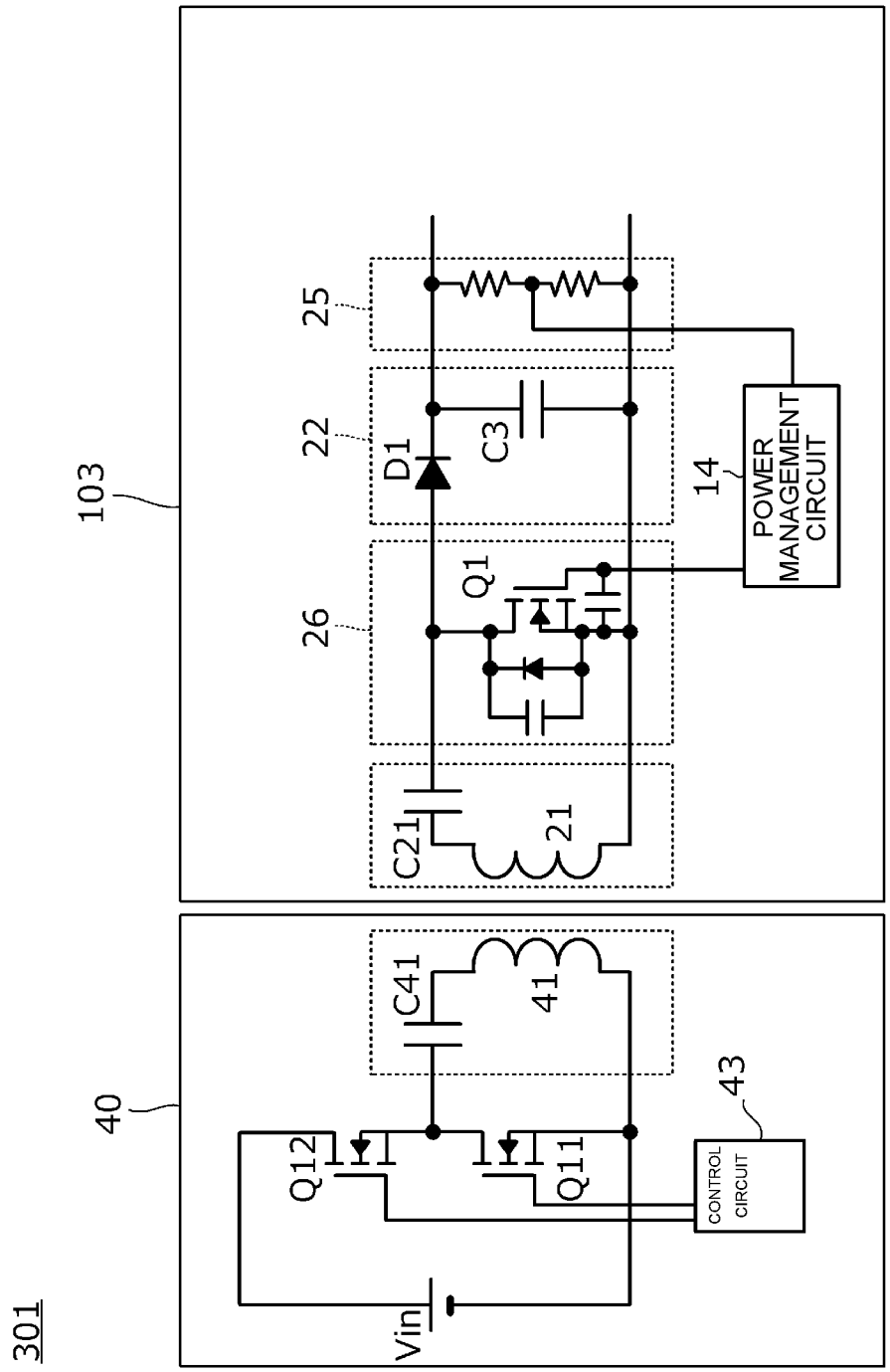
FIG. 6 is a block diagram illustrating a configuration of an electronic card, a reader/writer, and an electronic card system constituted by them according to a third embodiment.

FIG. 6 is a block diagram illustrating a configuration of the electronic card 103, the reader/writer 40, and an electronic card system 301 constituted by them according to the third embodiment.

The reader/writer 40 includes switching elements Q11 and Q12 that perform switching of a voltage of a direct-current power supply Vin, a control circuit 43 that controls these switching elements Q11 and Q12, the reader/writer antenna 41, and a resonant capacitor C41. In the electronic card 103, a power reception resonant circuit is constituted by the power reception coil 21 and the power reception resonant capacitor C21 connected in series with the power reception coil 21. Furthermore, the electronic card 103 includes the rectification stopping circuit 26, the rectifier smoothing circuit 22, the voltage detection circuit 25, and the power management circuit 14.

The rectification stopping circuit 26 is constituted by the switch element Q1 connected in parallel with the power reception resonant circuit. In this example, a parasitic capacitor formed between a gate and a source of the switch element Q1, and a parasitic diode and a parasitic capacitor that are formed between a drain and the source are also illustrated.

The rectifier smoothing circuit 22 is constituted by a diode D1 and a capacitor C3. The voltage detection circuit 25 is constituted by a resistive voltage divider circuit. The power management circuit 14 controls a gate-source voltage of the switch element Q1 in accordance with an output voltage of the voltage detection circuit 25. Thus, a rectification operation is stopped, and a resonant frequency of the power reception resonant circuit is changed.

Fourth Embodiment

In a fourth embodiment, another example of the power management circuit 14 and the rectification stopping circuit 26 will be described.

Figure 7A:
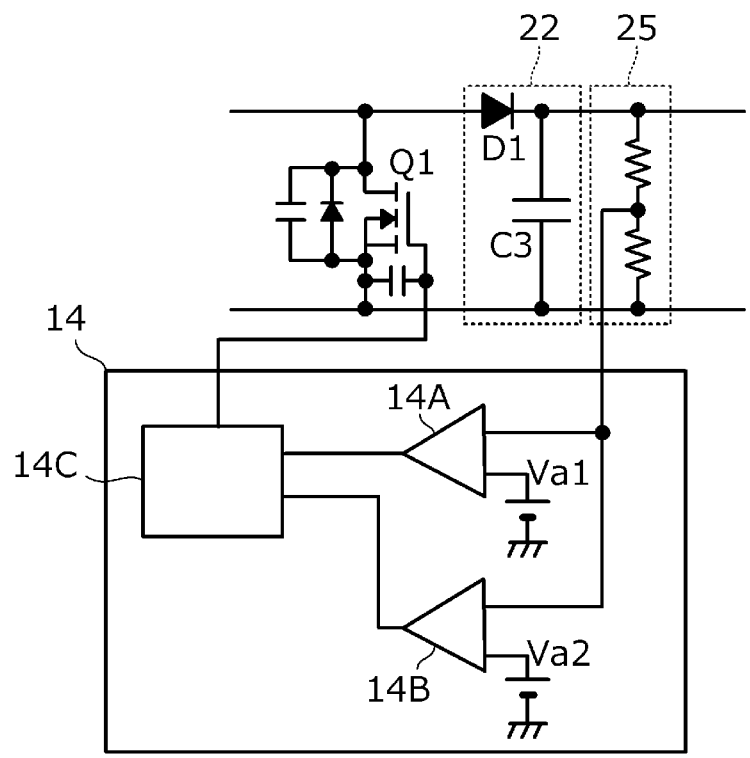
FIGS. 7A and 7B are diagrams each illustrating a configuration of a power management circuit and a rectification stopping circuit according to a fourth embodiment.
Figure 7B:
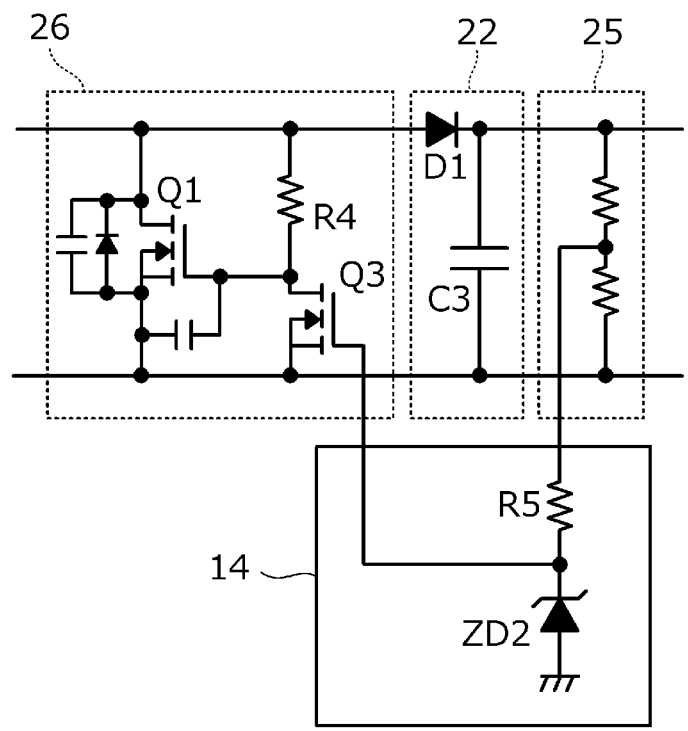

FIGS. 7A and 7B are diagrams each illustrating a configuration of the power management circuit 14 and the rectification stopping circuit 26 according to the fourth embodiment.

In an example illustrated in FIG. 7A, the power management circuit 14 includes comparators 14A and 14B, and a control circuit 14C. The comparator 14A compares an output voltage Va of the voltage detection circuit 25 with a voltage Va1 of the first threshold value, and the comparator 14B compares an output voltage of the voltage detection circuit 25 with a voltage Va2 of the second threshold value.

When both output signals of the comparators 14A and 14B are "Lo", that is, when Va<Va1 holds true, the control circuit 14C turns off the switch element Q1. When an output signal of the comparator 14A is "Hi" and an output signal of the comparator 14B is "Lo", that is, when Va1<Va<Va2 holds true, the control circuit 14C outputs a square-wave signal to the gate of the switch element Q1 to turn on or off the switch element Q1. When both output signals of the comparators 14A and 14B are "Hi", that is, when Va2<Va holds true, the control circuit 14C turns on the switch element Q1. In this configuration, rectification is not stopped when Va<Va1 holds true, a rectification operation is suppressed when Va1<Va<Va2 holds true, and the rectification operation is stopped when Va2<Va holds true. Furthermore, a resonant frequency of the power reception resonant circuit is changed.

In an example illustrated in FIG. 7B, the power management circuit 14 is constituted by a Zener diode ZD2 and a resistance element R5. Furthermore, the rectification stopping circuit 26 includes switch elements Q1 and Q3, and a resistance element R4.

When an output voltage of the voltage detection circuit 25 exceeds a Zener voltage of the Zener diode ZD2, the switch element Q3 of the rectification stopping circuit 26 is turned off, and the switch element Q1 is turned on. Thus, when a received power voltage exceeds a predetermined value, a rectification operation is stopped. Furthermore, a resonant frequency of the power reception resonant circuit is changed.

Fifth Embodiment

Figure 8:
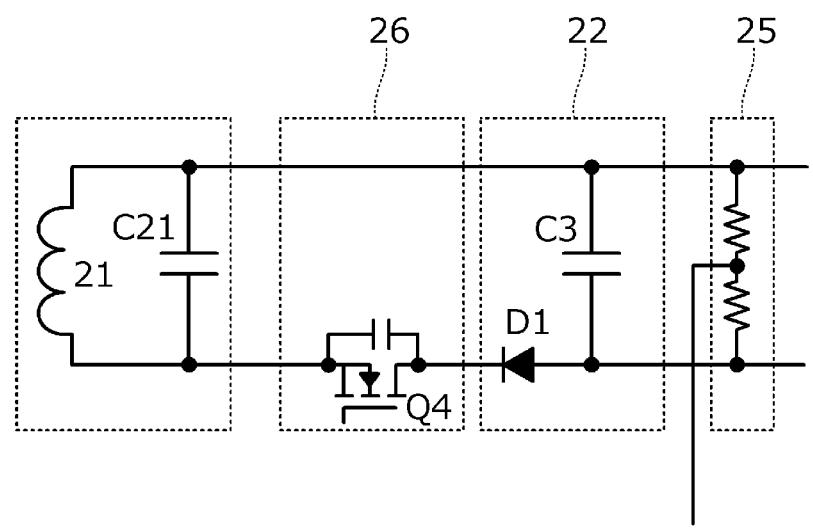
FIG. 8 is a diagram illustrating a configuration of the rectification stopping circuit according to a fifth embodiment.

In a fifth embodiment, another example of the rectification stopping circuit 26 will be described. FIG. 8 is a diagram illustrating a configuration of the rectification stopping circuit 26 according to the fifth embodiment. In this example, the rectification stopping circuit 26 is constituted by a switch element Q4 connected in series with a output line of the power reception resonant circuit constituted by the power reception coil 21 and the power reception resonant capacitor C21. The power management circuit, which is not illustrated, controls the switch element Q4 by applying a control voltage between a gate and a source of the switch element Q4. Thus, a rectification operation is stopped, and a resonant frequency of the power reception resonant circuit is changed.

Sixth Embodiment

Figure 9:
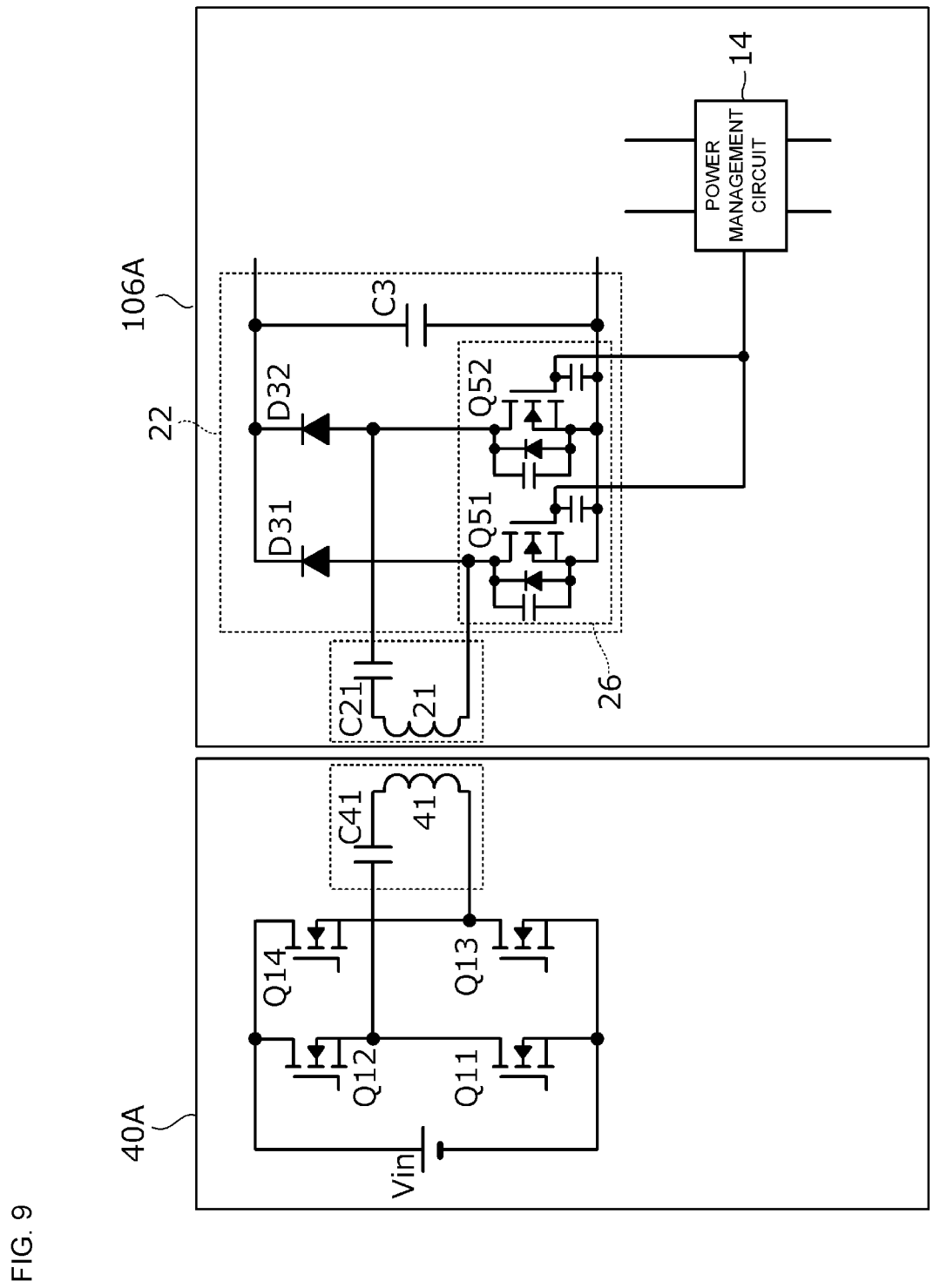
FIG. 9 is a diagram illustrating a configuration of a reader/writer and a rectifier smoothing circuit according to a sixth embodiment.

In a sixth embodiment, another example of the rectifier smoothing circuit 22 will be described. FIG. 9 is a diagram illustrating a configuration of a reader/writer 40A and the rectifier smoothing circuit 22 according to the sixth embodiment. In this example, the reader/writer 40A includes switching elements Q11, Q12, Q13, and Q14 that perform switching of a voltage of the direct-current power supply Vin, the reader/writer antenna 41, and the resonant capacitor C41. An electronic card 106A includes the rectifier smoothing circuit 22 including the rectification stopping circuit 26 therein, and the power management circuit 14.

The reader/writer 40A performs switching of a voltage of the direct-current power supply Vin by using the switching elements Q11, Q12, Q13, and Q14. The rectifier smoothing circuit 22 of the electronic card 106A includes a bridge circuit including diodes D31 and D32, and MOS-FET switch elements Q51 and Q52. A diode bridge circuit is constituted by these diodes D31 and D32, and body diodes of the switch elements Q51 and Q52. Furthermore, the rectification stopping circuit 26 is constituted by the switch elements Q51 and Q52. The power management circuit 14 short-circuits the power reception resonant circuit constituted by the power reception coil 21 and the power reception resonant capacitor C21 by turning on the switch elements Q51 and Q52. Thus, a rectification operation is stopped. Furthermore, a resonant frequency of the power reception resonant circuit is changed.

Figure 10:
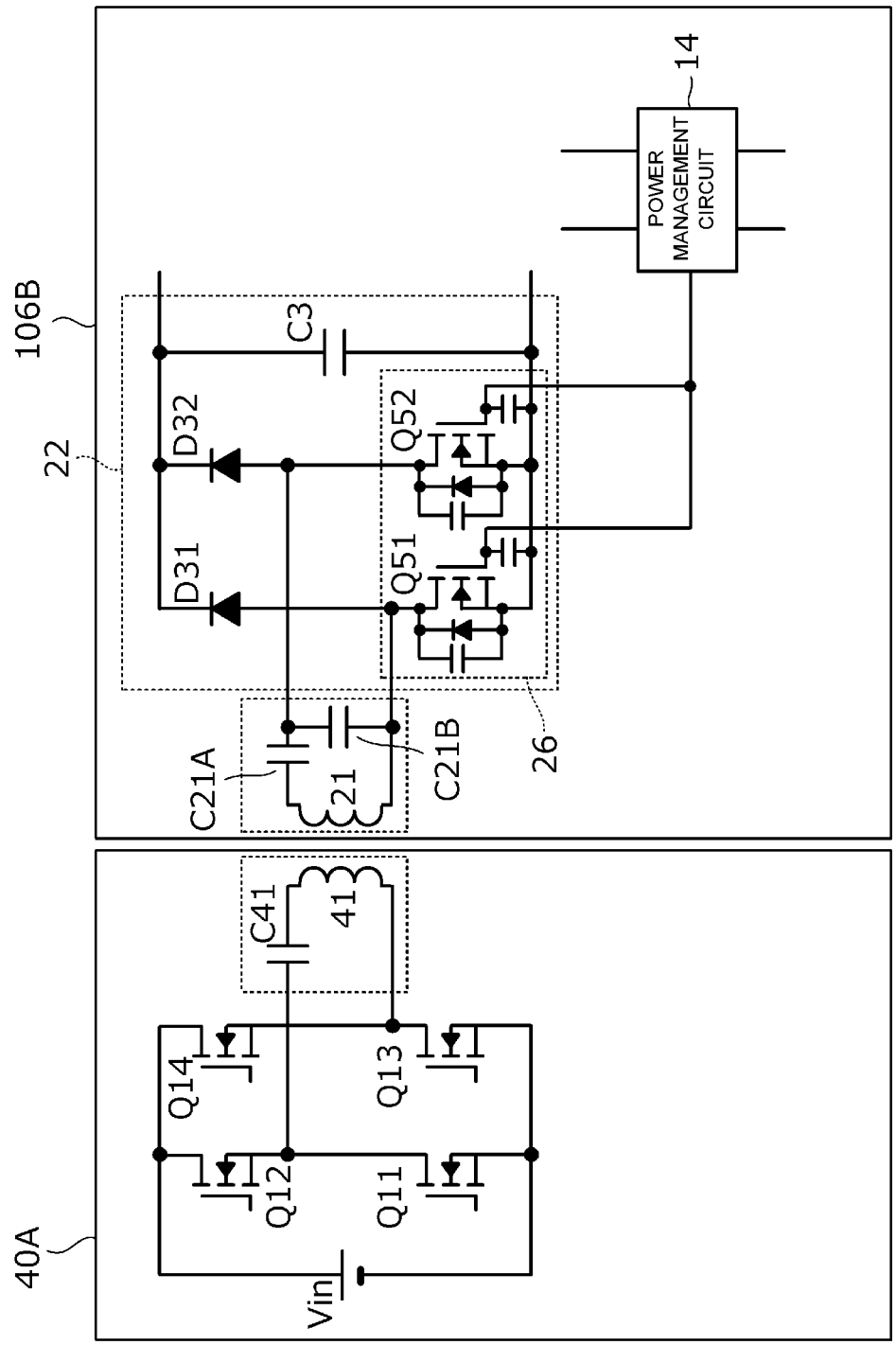
FIG. 10 is a diagram illustrating a configuration of another electronic card according to the sixth embodiment.

FIG. 10 is a diagram illustrating a configuration of another electronic card 106B according to the sixth embodiment. In this example, the power reception resonant circuit is constituted by the power reception coil 21 and power reception resonant capacitors C21A and C21B. The other circuit configurations are similar to those illustrated in FIG. 9. The power management circuit 14 short-circuits the power reception resonant circuit constituted by the power reception coil 21 and the power reception resonant capacitors C21A and C21B by turning on the switch elements Q51 and Q52. Thus, a rectification operation is stopped. Furthermore, a resonant frequency of the power reception resonant circuit is changed.

Figure 11:
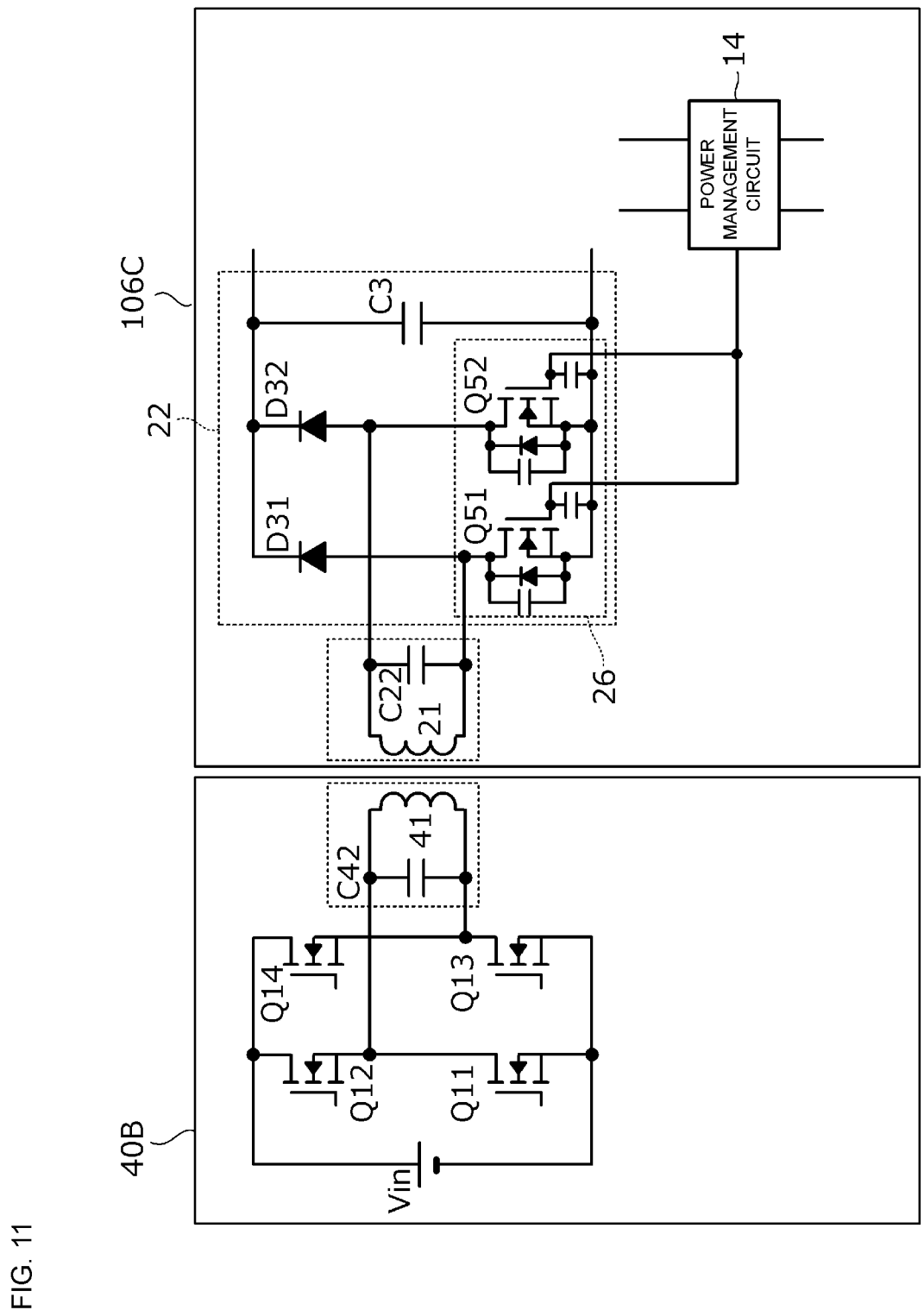
FIG. 11 is a diagram illustrating a configuration of another reader/writer and another electronic card according to the sixth embodiment.

FIG. 11 is a diagram illustrating a configuration of another reader/writer 40B and another electronic card 106C according to the sixth embodiment. In this example, the reader/writer 40B includes the switching elements Q11, Q12, Q13, and Q14 that perform switching of a voltage of the direct-current power supply Vin, the reader/writer antenna 41, and a resonant capacitor C42. The reader/writer antenna 41 and the resonant capacitor C42 are connected in parallel with each other. The electronic card 106C includes the power reception resonant circuit constituted by the power reception coil 21 and a power reception resonant capacitor C22. The power reception coil 21 and the power reception resonant capacitor C22 are connected in parallel with each other. The other circuit configurations are similar to those illustrated in FIG. 9. The power management circuit 14 short-circuits the power reception resonant circuit constituted by the power reception coil 21 and the power reception resonant capacitor C22 by turning on the switch elements Q51 and Q52. Thus, a rectification operation is stopped. Furthermore, a resonant frequency of the power reception resonant circuit is changed.

Seventh Embodiment

Figure 12:
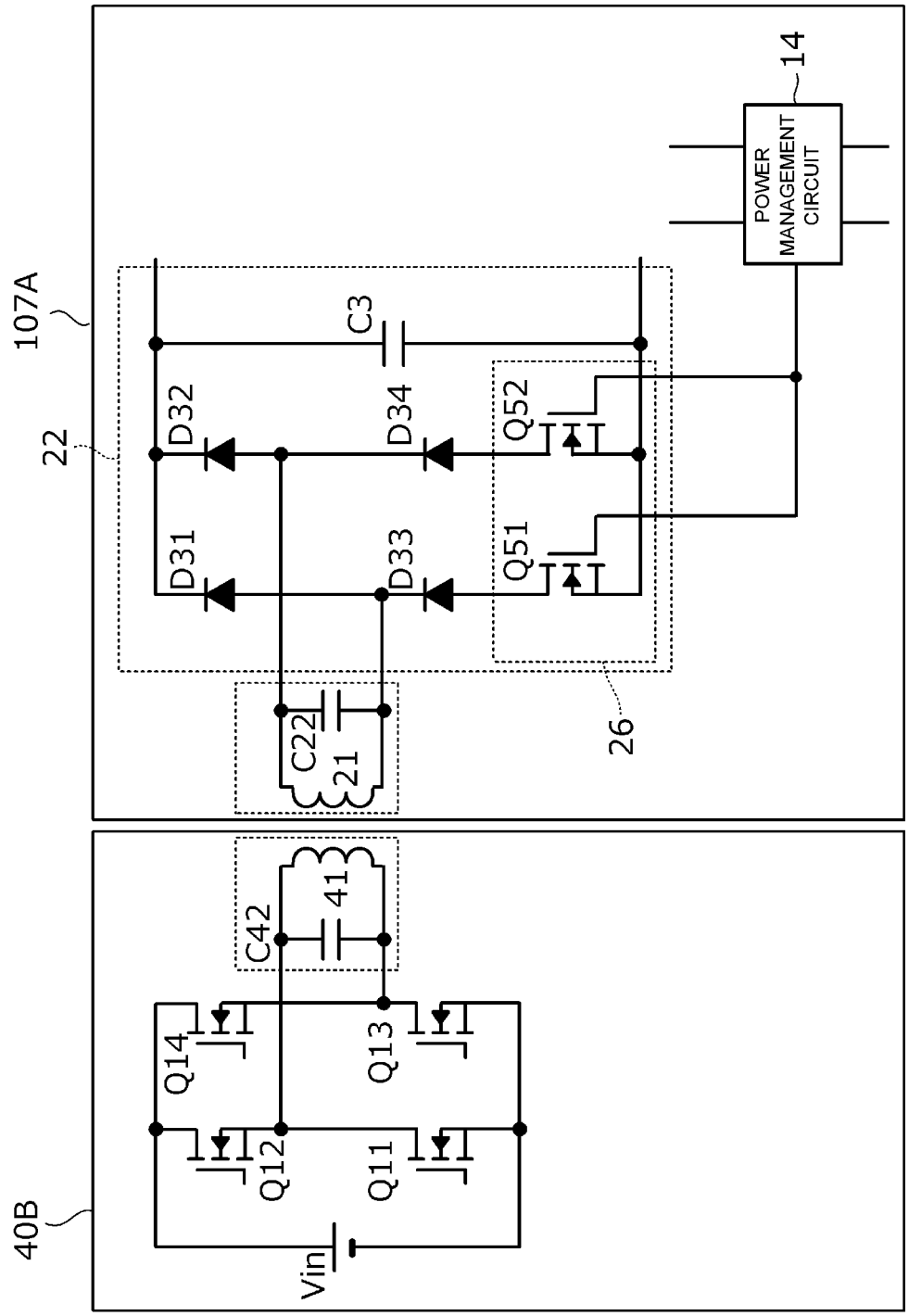
FIG. 12 is a diagram illustrating a configuration of the reader/writer and an electronic card according to a seventh embodiment.

In a seventh embodiment, another example of the rectifier smoothing circuit 22 will be described. FIG. 12 is a diagram illustrating a configuration of the reader/writer 40B and an electronic card 107A according to the seventh embodiment. In this example, the rectifier smoothing circuit 22 of the electronic card 107A includes a bridge circuit constituted by diodes D31, D32, D33, and D34. Furthermore, the rectification stopping circuit 26 is constituted by the switch elements Q51 and Q52. The power management circuit 14 causes the bridge circuit constituted by the diodes D31, D32, D33, and D34 to operate by turning on the switch elements Q51 and Q52 and stops a rectification operation by turning off the switch elements Q51 and Q52. Furthermore, a resonant frequency of the power reception resonant circuit is changed.

Figure 13:
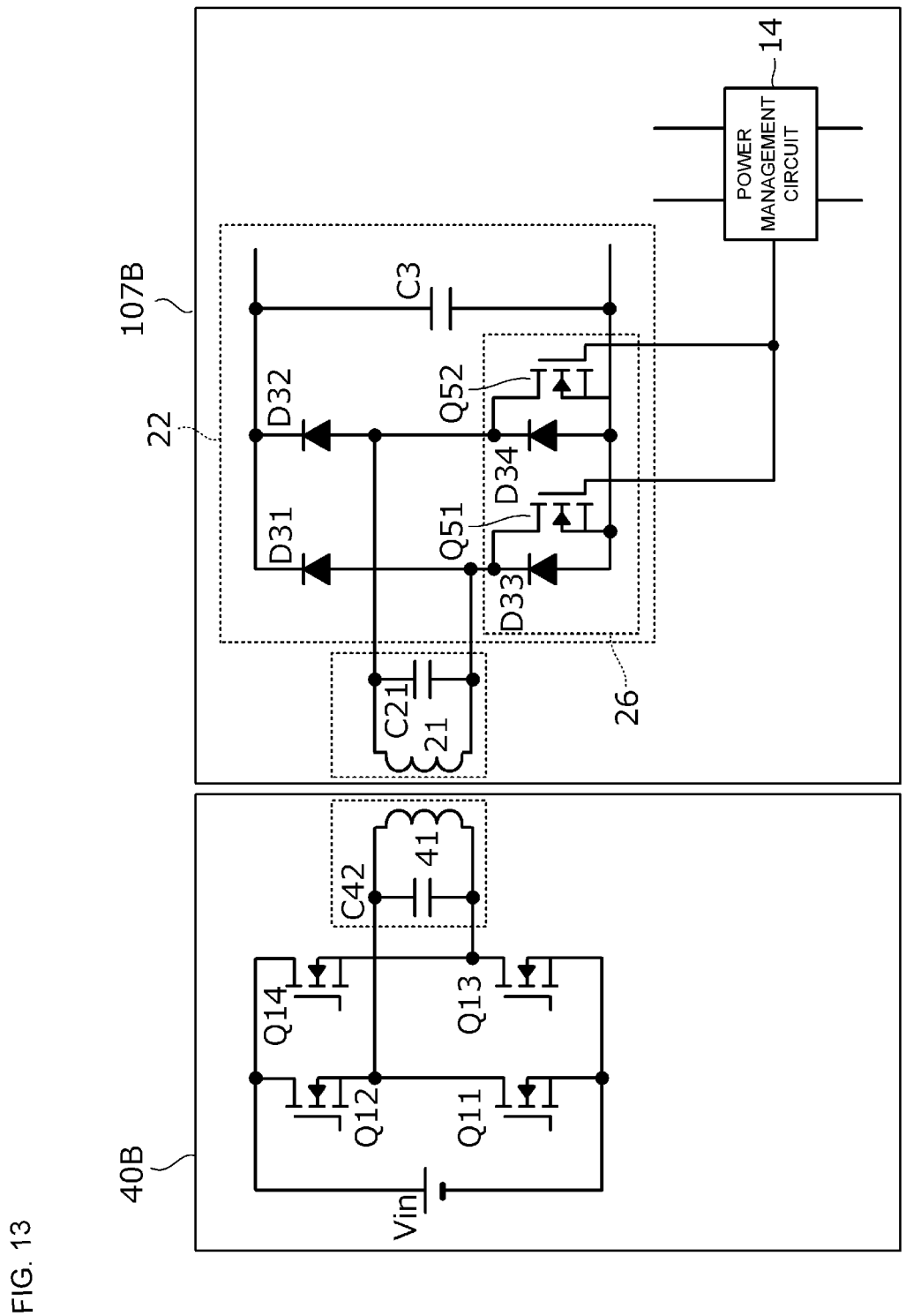
FIG. 13 is a diagram illustrating a configuration of another electronic card according to the seventh embodiment.

FIG. 13 is a diagram illustrating a configuration of another electronic card 107B according to the seventh embodiment. In this example, the rectifier smoothing circuit 22 of the electronic card 107B includes a bridge circuit constituted by the diodes D31, D32, D33, and D34. Furthermore, the rectification stopping circuit 26 is constituted by the switch elements Q51 and Q52. The switch elements Q51 and Q52 are connected in parallel with the diodes D33 and D34. The power management circuit 14 causes the bridge circuit constituted by the diodes D31, D32, D33, and D34 to operate by putting the switch elements Q51 and Q52 into an off state and stops a rectification operation by turning on the switch elements Q51 and Q52. Furthermore, a resonant frequency of the power reception resonant circuit is changed.

Eighth Embodiment

In an eighth embodiment, an electronic card including a magnetic material that forms and controls a magnetic path of a magnetic flux that links with the power reception coil or the communication antenna will be exemplified.

Figure 14A:
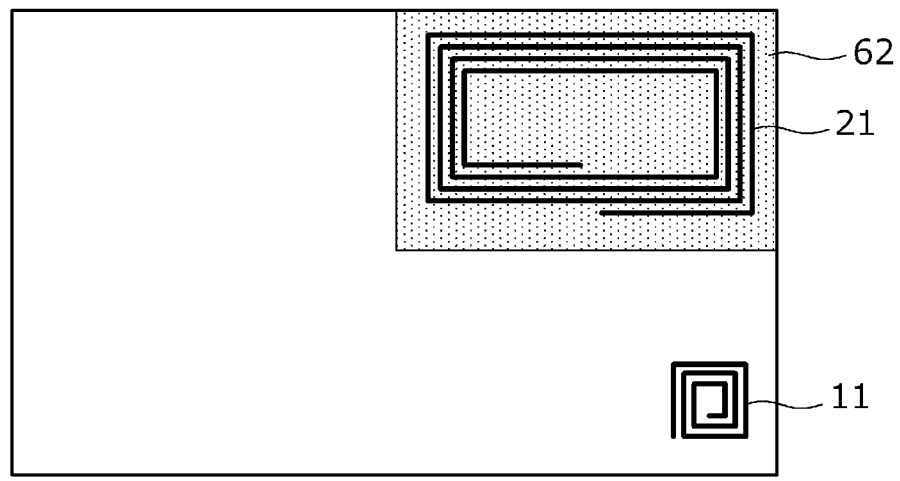
FIGS. 14A, 14B, and 14C are plan views of electronic cards according to an eighth embodiment and illustrating, in particular, a configuration of a communication antenna, a power reception coil, and magnetic sheets disposed in proximity to them.
Figure 14B:
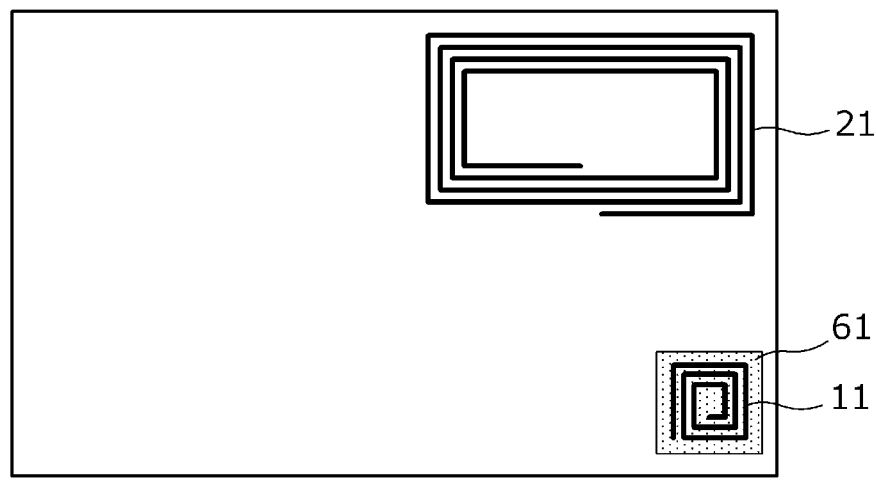
Figure 14C:
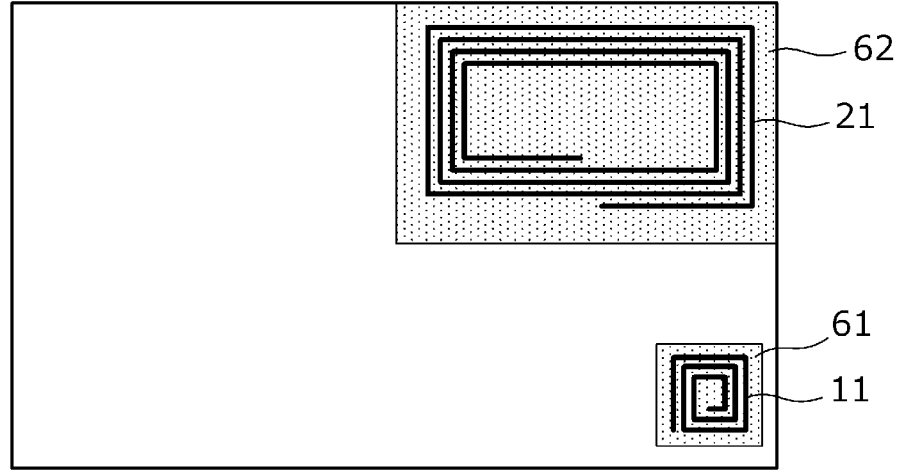

FIGS. 14A, 14B, and 14C are plan views of electronic cards 108A, 108B, and 108C according to the eighth embodiment and illustrating, in particular, a configuration of the communication antenna 11, the power reception coil 21, and magnetic sheets 61 and 62 disposed in proximity to them.

In all of the electronic card 108A, 108B, and 108C, the communication antenna 11 and the power reception coil 21 are disposed along a plane. The communication antenna 11 is constituted by a square or rectangular spiral coil conductor that is wound a number of turns. The power reception coil 21 is also constituted by a square or rectangular spiral coil conductor that is wound a number of turns.

In an example illustrated in FIG. 14A, the power reception coil magnetic sheet 62 is provided to be in surface contact with the power reception coil 21. The power reception coil magnetic sheet 62 is obtained, for example, by forming magnetic ferrite into a flexible sheet. The power reception coil magnetic sheet 62 is away from the communication antenna 11.

In this configuration, the power reception coil magnetic sheet 62 functions as part of a magnetic path of a magnetic flux that links with the power reception coil 21, and thus the magnetic flux passing through a coil opening of the power reception coil 21 is kept from spreading, enabling a coupling coefficient between the communication antenna 11 and the power reception coil 21 to be easily reduced.

In an example illustrated in FIG. 14B, the communication antenna magnetic sheet 61 is provided to be in surface contact with the communication antenna 11. The communication antenna magnetic sheet 61 is obtained, for example, by forming magnetic ferrite into a flexible sheet. The power reception coil 21 is away from the communication antenna magnetic sheet 61.

In this configuration, the communication antenna magnetic sheet 61 functions as part of a magnetic path of a magnetic flux that links with the communication antenna 11, and thus the magnetic flux passing through a coil opening of the communication antenna 11 is kept from spreading, enabling a coupling coefficient between the communication antenna 11 and the power reception coil 21 to be easily reduced.

In an example illustrated in FIG. 14C, the power reception coil magnetic sheet 62 and the communication antenna magnetic sheet 61 are provided to be in surface contact with the power reception coil 21 and the communication antenna 11. The power reception coil magnetic sheet 62 and the communication antenna magnetic sheet 61 are each obtained, for example, by forming magnetic ferrite into a flexible sheet. The power reception coil magnetic sheet 62 and the communication antenna magnetic sheet 61 are away from each other.

This configuration can keep a magnetic flux passing through a coil opening of the power reception coil 21 from spreading, further keep a magnetic flux passing through a coil opening of the communication antenna 11 from spreading, and easily reduce a coupling coefficient between the communication antenna 11 and the power reception coil 21.

Finally, the present disclosure is not intended to be limited to the above-described embodiments. Modifications and changes may be made as appropriate by those skilled in the art. The scope of the present disclosure is defined not by the above-described embodiments but by the claims. Furthermore, the scope of the present disclosure includes modifications and changes made to the embodiments within a scope equivalent to the claims.

What is claimed is:

1. A wireless power reception device comprising:
   a power reception coil configured to magnetically couple to an external reader/writer-side coil;
   a resonant capacitor configuring a power reception resonant circuit together with the power reception coil;
   a rectifier smoothing circuit configured to rectify and smooth a voltage of the power reception resonant circuit;
   a received power voltage detection circuit configured to detect an output voltage of the rectifier smoothing circuit;
   an electrical energy storage device;
   a charging circuit configured to charge the electrical energy storage device with an output of the rectifier smoothing circuit;
   a communication antenna configured to magnetically couple to the external reader/writer-side coil;
   a wireless communication circuit connected to the communication antenna;
   an electronic functional circuit connected to the wireless communication circuit and configured to perform input and output of a signal;
   a power management circuit connected to the electrical energy storage device and configured to supply a power-supply voltage to the electronic functional circuit; and
   a rectification stopping circuit connected to an input portion of the rectifier smoothing circuit or connected to the rectifier smoothing circuit, and configured to cause the rectifier smoothing circuit to stop a rectification operation,
   wherein
   a magnetic coupling coefficient between the power reception coil and the communication antenna is 0.3 or less, and
   the power management circuit is configured to suppress electromagnetic interference between the power reception coil and the communication antenna in a predetermined time period by causing the rectification stopping circuit to operate to keep the rectification stopping circuit in an operation state in the predetermined time period with a received power voltage exceeding a first threshold value and by changing a resonant frequency of the power reception resonant circuit to a frequency different from a frequency being used in the wireless communication circuit to keep the resonant frequency in a changed state.

2. The wireless power reception device according to claim 1, wherein
   the predetermined time period is a time period that elapses before operation of the wireless communication circuit is completed.

3. The wireless power reception device according to claim 2, wherein
   after the received power voltage reaches the first threshold value, the power management circuit is configured to keep power reception in an interrupted state until the received power voltage falls below a second threshold value lower than the first threshold value.

4. The wireless power reception device according to claim 2, wherein
   the rectifier smoothing circuit includes a rectifier diode and a smoothing capacitor, and
   the rectification stopping circuit includes a transistor connected between input portions of the rectifier smoothing circuit, and the transistor is connected in parallel with the resonant capacitor or the power reception coil and is configured to cause the rectifier smoothing circuit to stop an operation.

5. The wireless power reception device according to claim 2, wherein
   the rectifier smoothing circuit includes a rectifier diode and a smoothing capacitor, and
   the rectification stopping circuit includes a transistor connected to the rectifier diode, and the transistor is configured to short-circuit the rectifier diode to cause the rectifier smoothing circuit to stop an operation.

6. The wireless power reception device according to claim 2, wherein
   a magnetic coupling coefficient between the power reception coil and the communication antenna is 0.1 or less.

7. The wireless power reception device according to claim 2, further comprising:
   a magnetic material configuring a magnetic path of a magnetic flux configured to link with the power reception coil or the communication antenna.

8. The wireless power reception device according to claim 2, further comprising:
   a power consumption circuit configured to consume output power of the rectifier smoothing circuit with the received power voltage exceeding a third threshold value lower than the first threshold value.

9. The wireless power reception device according to claim 1, wherein
   after the received power voltage reaches the first threshold value, the power management circuit is configured to keep power reception in an interrupted state until the received power voltage falls below a second threshold value lower than the first threshold value.

10. The wireless power reception device according to claim 9, wherein
    the rectifier smoothing circuit includes a rectifier diode and a smoothing capacitor, and
    the rectification stopping circuit includes a transistor connected between input portions of the rectifier smoothing circuit, and the transistor is connected in parallel with the resonant capacitor or the power reception coil and is configured to cause the rectifier smoothing circuit to stop an operation.

11. The wireless power reception device according to claim 9, wherein
the rectifier smoothing circuit includes a rectifier diode and a smoothing capacitor, and
the rectification stopping circuit includes a transistor connected to the rectifier diode, and the transistor is configured to short-circuit the rectifier diode to cause the rectifier smoothing circuit to stop an operation.

12. The wireless power reception device according to claim 1, wherein
the rectifier smoothing circuit includes a rectifier diode and a smoothing capacitor, and
the rectification stopping circuit includes a transistor connected between input portions of the rectifier smoothing circuit, and the transistor is connected in parallel with the resonant capacitor or the power reception coil and is configured to cause the rectifier smoothing circuit to stop an operation.

13. The wireless power reception device according to claim 12, wherein
the power management circuit includes a comparator configured to control the transistor by comparing the received power voltage with a voltage of a threshold value.

14. The wireless power reception device according to claim 1, wherein
the rectifier smoothing circuit includes a rectifier diode and a smoothing capacitor, and
the rectification stopping circuit includes a transistor connected to the rectifier diode, and the transistor is configured to short-circuit the rectifier diode to cause the rectifier smoothing circuit to stop an operation.

15. The wireless power reception device according to claim 14, wherein
the power management circuit includes a comparator configured to control the transistor by comparing the received power voltage with a voltage of a threshold value.

16. The wireless power reception device according to claim 1, wherein
a magnetic coupling coefficient between the power reception coil and the communication antenna is 0.1 or less.

17. The wireless power reception device according to claim 1, further comprising:
a magnetic material configuring a magnetic path of a magnetic flux configured to link with the power reception coil or the communication antenna.

18. The wireless power reception device according to claim 1, further comprising:
a power consumption circuit configured to consume output power of the rectifier smoothing circuit with the received power voltage exceeding a third threshold value lower than the first threshold value.

19. The wireless power reception device according to claim 18, wherein
the power consumption circuit includes a Zener diode configured to conduct with the received power voltage exceeding the third threshold value.

20. The wireless power reception device according to claim 18, wherein
the power consumption circuit includes a switch element configured to conduct with the received power voltage exceeding the third threshold value.

* * * * *